United States Patent [19]

Henzi

[11] Patent Number: 4,874,392
[45] Date of Patent: Oct. 17, 1989

[54] MONOAZO DYES HAVING A SUBSTITUTED 1,4-PHENYLENE COUPLING COMPONENT RADICAL HAVING ONE $C_{8-14}$ ALKYL GROUP OR MOIETY

[75] Inventor: Beat Henzi, Basle, Switzerland

[73] Assignee: Sandoz Ltd., Basle, Switzerland

[21] Appl. No.: 79,080

[22] Filed: Jul. 29, 1987

[30] Foreign Application Priority Data

Aug. 1, 1986 [DE] Fed. Rep. of Germany ....... 3626139

[51] Int. Cl.$^4$ .................. C09B 29/08; D06P 1/18; D06P 3/54
[52] U.S. Cl. .......................................... 8/662; 8/667; 8/670; 8/921; 8/922; 8/924; 534/649; 534/753
[58] Field of Search ................... 534/753, 649; 8/691, 8/667, 670, 662

[56] References Cited

U.S. PATENT DOCUMENTS

| | | | |
|---|---|---|---|
| 3,455,898 | 7/1969 | Seefelder et al. | 534/788 |
| 4,465,628 | 8/1984 | Grund et al. | 534/788 |
| 4,488,992 | 12/1984 | Yoshinaga et al. | 534/788 |
| 4,542,207 | 9/1985 | Niwa et al. | 534/788 |
| 4,681,932 | 7/1987 | Kruckenberg et al. | 534/575 |
| 4,734,101 | 3/1988 | Himend et al. | 8/524 |
| 4,743,269 | 5/1988 | Haebler et al. | 8/639 |

FOREIGN PATENT DOCUMENTS

| | | |
|---|---|---|
| 122482 | 10/1984 | European Pat. Off. . |
| 226155 | 6/1987 | European Pat. Off. . |
| 228092 | 7/1987 | European Pat. Off. . |
| 2222639 | 11/1972 | Fed. Rep. of Germany . |
| 953719 | 4/1964 | United Kingdom . |
| 1162219 | 8/1969 | United Kingdom . |
| 1447795 | 9/1976 | United Kingdom . |
| 2036809 | 7/1980 | United Kingdom . |

Primary Examiner—A. Lionel Clingman
Attorney, Agent, or Firm—Gerald D. Sharkin; Richard E. Vila; Melvyn M. Kassenoff

[57] ABSTRACT

A Monoazo compounds of the formula

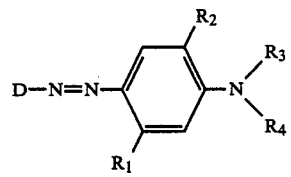

wherein
D is a diazo component radical of the 4-nitrophenyl series, thienyl-2 series, thiazolyl-2 series or 5-nitrobenzoisothiazolyl-3 series,
$R_1$ is hydrogen; $C_{1-2}$alkyl; $C_{1-2}$alkoxy; formylamino; ($C_{1-4}$alkyl)carbonylamino; ($C_{1-4}$alkyl)carbonylamino the alkyl group of which is substituted by 1 to 3 substituents independently selected from halo, $C_{1-3}$alkoxy, cyano, phenyl, phenoxy and benzyloxy; ($C_{2-4}$alkenyl)carbonylamino; halo($C_{2-4}$alkenyl)carbonylamino; benzoylamino; benzoylamino the phenyl group of which is substituted by 1 to 3 substituents independently selected from halo, $C_{1-4}$alkyl and $C_{1-4}$alkoxy; ($C_{1-4}$alkoxy)carbonylamino; ($C_{1-4}$alkoxy)carbonylamino the alkyl moiety of which is substituted by 1 to 3 substituents independently selected from halo, $C_{1-3}$alkoxy, cyano, phenyl, phenoxy and benzyloxy; ($C_{8-14}$alkyl)carbonylamino or ($C_{8-14}$alkoxy)carbonylamino,
$R_2$ is $C_{1-4}$alkoxy or 2-($C_{1-4}$alkoxy)ethoxy,
$R_3$ is hydrogen, $C_{1-4}$alkyl, $C_{8-14}$alkyl, 2-($C_{8-14}$alkoxy)carbonylethyl, 2-($C_{8-14}$alkyl)carbonyloxyethyl or 2-($C_{8-14}$alkoxy)carbonyloxyethyl, and
$R_4$ is hydrogen, $C_{1-4}$alkyl, 2-cyanoethyl, 2-($C_{1-3}$alkoxy)ethyl, 2-($C_{1-4}$alkyl)carbonyloxyethyl, 2-($C_{1-4}$alkoxy)carbonylethyl, 2-($C_{1-4}$alkoxy)carbonyloxyethyl, $C_{3-4}$alkenyl, which are useful for dyeing textile materials, for example polyester.

20 Claims, No Drawings

MONOAZO DYES HAVING A SUBSTITUTED 1,4-PHENYLENE COUPLING COMPONENT RADICAL HAVING ONE C$_{8-14}$ ALKYL GROUP OR MOIETY

The invention relates to monoazo dyes suitable for dyeing textile substrates, for example polyester.

According to the invention, there is provided a method for dyeing a textile substrate comprising applying to the substrate a compound of formula I

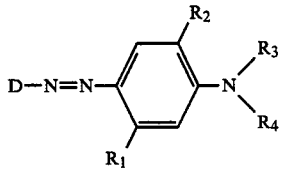

in which D is a diazo component radical of the 4-nitrophenyl series, thienyl-2series, thiazolyl-2 series or 5-nitrobenzisothiazolyl-3 series;

R$_1$ is hydrogen; C$_{1-2}$alkyl; C$_{1-2}$alkoxy; formylamino; C$_{1-4}$alkylcarbonylamino in which the alkyl group can bear 1 to 3 groups independently selected from halogen, C$_{1-3}$alkoxy, phenoxy, phenyl, benzyloxy and cyano; C$_{1-4}$alkoxycarbonylamino in which the alkyl group can bear 1 to 3 groups independently selected from halogen, C$_{1-3}$alkoxy, phenoxy, phenyl, cyano and benzyloxy; benzoylamino in which the phenyl group can bear 1 to 3 groups independently selected from halogen, C$_{1-4}$alkyl and C$_{1-4}$alkoxy; C$_{2-4}$alkenylcarbonylamino; halo-C$_{2-4}$alkenylcarbonylamino; C$_{8-14}$alkylcarbonylamino or C$_{8-14}$alkoxycarbonylamino;

R$_2$ is C$_{1-4}$alkoxy (preferably C$_{1-2}$alkoxy) or 2-(C$_{1-4}$alkoxy)ethoxy (preferably 2-(C$_{1-2}$alkoxy)ethoxy);

R$_3$ is C$_{8-14}$alkyl, hydrogen, 2-C$_{8-14}$alkoxycarbonylethyl, 2-C$_{8-14}$alkylcarbonyloxyethyl, 2-C$_{8-14}$alkoxycarbonyloxyethyl or C$_{1-4}$alkyl; and R$_4$ is hydrogen, C$_{1-4}$alkyl, 2-cyanoethyl, C$_{3-4}$alkenyl, 2-C$_{1-3}$alkoxyethyl, 2-C$_{1-4}$alkylcarbonyloxyethyl, 2-C$_{1-4}$alkoxycarbonylethyl, C$_{8-14}$alkyl, 2-C$_{1-4}$alkoxycarbonyloxyethyl, 2-C$_{8-14}$alkylcarbonyloxyethyl, 2-C$_{8-14}$alkoxycarbonylethyl, 2-C$_{8-14}$alkoxycarbonyloxyethyl or

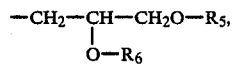

wherein R$^5$ is C$_{1-4}$alkyl, allyl, C$_{1-3}$alkylcarbonyl or phenyl, unsubstituted or substituted by 1 to 3 groups, independently selected from halogen C$_{1-2}$alkyl and C$_{1-2}$alkoxy, and R$_6$ is hydrogen, C$_{1-4}$alkyl or —COC$_{1-3}$alkyl, with the proviso that one and only one of R$_1$, R$_3$ and R$_4$ is or contains a C$_{8-14}$alkyl group or moiety.

Unless otherwise indicated, each C$_{1-4}$alkyl or C$_{8-14}$alkyl group, or moiety may be linear and branched and is preferably the former.

Any alkyl group and moiety in R$_1$ that may bear 1 to 3 substituents is preferably unsubstituted or monosubstituted, more preferably the former.

In this Specification any phenyl group is preferably unsubstituted or monosubstituted.

Any C$_{1-3}$alkyl or C$_{1-4}$alkyl group or moiety is preferably methyl or ethyl when unsubstituted. Any substituted C$_{1-4}$alkyl group or moiety is preferably substituted C$_{1-3}$alkyl when monosubstituted, substituted C$_{2-4}$alkyl when disubstituted and substituted C$_{3-4}$alkyl when trisubstituted. Any C$_{1-3}$alkoxy or C$_{1-4}$alkoxy group or moiety is preferably methoxy or ethoxy.

In this Specification, halogen is preferably fluoro, chloro or bromo, more preferably chloro or bromo.

Preferably D is D' where D' is a group of formula a, b, c, or d

in which R$_7$ is hydrogen, cyano or halogen;
one of R$_8$ and R$_9$ is hydrogen and the other is hydrogen or chloro (more preferably both R$_8$ and R$_9$ are hydrogen);
R$_{10}$ is cyano or nitro;
R$_{11}$ is hydrogen, halogen, C$_{1-4}$alkyl or phenyl;
R$_{12}$ is formyl, cyano, nitro, C$_{1-4}$alkoxycarbonyl or C$_{1-4}$alkylcarbonyl;
R$_{13}$ is hydrogen, chloro, C$_{1-3}$alkyl or phenyl; and
R$_{14}$ is cyano, nitro or C$_{1-4}$alkoxycarbonyl.

More preferably D is D'' where D'' is a group of formula a'

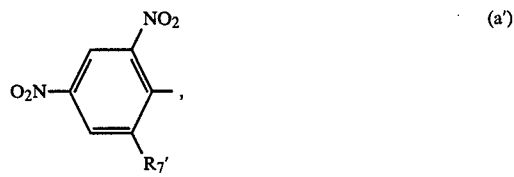

in which R$_7$' is chloro or bromo.

Preferably R$_1$ is R$_1$' where R$_1$' is C$_{1-2}$alkylcarbonylamino.

Preferably R$_2$ is R$_2$' where R$_2$' is C$_{1-2}$alkoxy or 2-(C$_{1-2}$alkoxy)ethoxy. More preferably R$_2$ is R$_2$'' where R$_2$'' is C$_{1-2}$alkoxy.

Preferably when R$_3$ is hydrogen or C$_{1-4}$alkyl, then R$_4$ is 2-C$_{8-14}$alkoxycarbonylethyl.

More preferably R$_3$ is R$_3$' and R$_4$ is R$_4$' where R$_3$' is hydrogen or C$_{1-4}$alkyl and R$_4$' is 2-C$_{10-12}$alkoxycarbonylethyl or R$_3$' is C$_{10-12}$alkyl and R$_4$' is hydrogen or allyl.

Compounds of formula I can be prepared by coupling a diazotised amine of formula II

with a compound of formula III

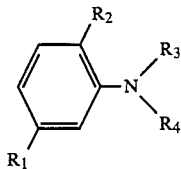

Compounds of formulae II and III are known or may be prepared by known methods from known compounds. Diazotisation and coupling can be carried out by known methods.

Compounds of formula I are new.

Compounds of formula I can be worked up into dyeing preparations in known ways, for example by milling (e.g. sand milling) in the presence of a dispersing agent or filling material. The preparation so produced, which may be dried in vacuum or by atomisation, can be used in a long or a short dyebath for dyeing, padding or printing material.

The dyes of the invention exhaust very well (preferably at temperatures over 120° C., more preferably over 130° C.) to give deep shades on synthetic or semi-synthetic hydrophobic high molecular weight textile material from an aqueous suspension. The dyestuffs of the invention are particularly useful for dyeing, padding or printing textile material made from linear aromatic polyester, cellulose 2½ acetate, cellulose triacetate or synthetic polyamide.

Dyeing, printing or padding may be carried out by known methods, in particular according to the methods described in UK Pat. No. 1,114,433 (=FP 1,445,371).

Compounds of formula I produce dyeings having excellent wet and contact fastness after thermal treatment (for example drying, after-fixing and finishing optionally in the presence of a finishing agent).

Besides having excellent wet and contact fastnesses, dyeings with compounds of formula I have generally good fastness properties.

The invention will now be illustrated by the following Examples in which all parts and percentages are by weight and all temperatures are in °C.

EXAMPLE 1

26.3 Parts of 2,4-dinitro-6-bromoaniline (99.6%) are dissolved in 130 parts of 94% sulphuric acid and are then diazotised at 15° to 20° C. with 36.5 parts of 40% nitrosylsulphuric acid.

42.9 Parts of 1-acetylamino-3-(2-n-dodecyloxycarbonylethyl) amino-4-methoxybenzene are dissolved in a mixture of 500 parts of glacial acetic acid and 70 parts of water. 2.5 Parts of aminosulphonic acid are added, the mixture is cooled to 0°–5° C. and the diazonium solution which has been cooled to 0°–5° C. is slowly added to the coupling component together with an even slower addition of 500 parts of water (at 0°–5° C.) whilst stirring well. The resulting dyestuff suspension is filtered, washed neutral with warm water and dried at about 50° C. under vacuum. The resultant dyestuff is of formula 1a

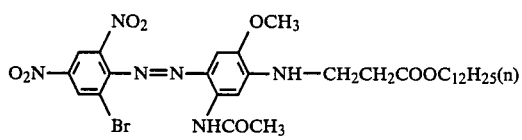

($\lambda$max in DMF = 598 nm)

and dyes polyester a navy-blue shade with good fastness properties, in particular excellent wet and contact fastness properties after thermal aftertreatment.

The $C_{10-14}$alkyl group or moiety of each compound of Examples 2–29 and 31–53 is linear, and the $R_3$ group of Example 30 is 1-methyl-n-undecyl. Each —$C_2H_4$— radical in the examples is —$(CH_2)_2$—.

EXAMPLES 2 TO 30

Compounds of the formula

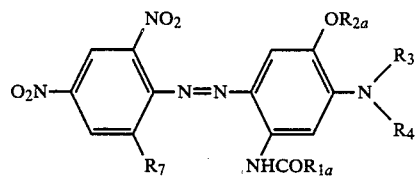

in which $R_{1a}$ to $R_7$ are as defined in Table 1 below, can be prepared by a method analogous to that of Example 1 from appropriate reactants.

TABLE 1

| Ex. No. | $R_7$ | $R_{1a}$ | $R_{2a}$ | $R_3$ | $R_4$ | $\lambda$max. in nm | Shades of dyeing on polyester |
|---|---|---|---|---|---|---|---|
| 2 | Br | —$CH_3$ | —$CH_3$ | —$C_2H_4COOC_{10}H_{21}$ | H | 598 | navy blue |
| 3 | " | " | " | —$C_2H_4COOC_{14}H_{29}$ | H | 598 | " |
| 4 | " | " | " | —$C_2H_4COOC_{10}H_{21}$ | —$C_2H_5$ | 607 | greenish-blue |
| 5 | " | " | " | —$C_2H_4COOC_{12}H_{25}$ | " | 607 | " |
| 6 | Cl | " | " | " | " | 608 | " |
| 7 | " | " | " | " | H | 599 | navy blue |
| 8 | I | " | " | " | H | 597 | " |
| 9 | " | " | " | " | —$C_2H_5$ | 606 | greenish-blue |
| 10 | Br | " | —$C_2H_5$ | —$C_2H_4COOC_{10}H_{25}$ $C_{12}H_{25}$ } 1:1 | " | 599 | navy blue |
| 11 | " | " | " | " | H | 599 | " |
| 12 | " | " | —$C_2H_4OCH_3$ | —$C_2H_4COOC_{12}H_{25}$ | H | 600 | " |
| 13 | " | " | " | " | —$C_2H_5$ | 609 | greenish-blue |
| 14 | " | —$C_2H_5$ | —$CH_3$ | " | H | 599 | navy blue |
| 15 | " | —$CH_2$—Cl | " | " | H | 596 | " |
| 16 | " | —$CH_2$—O—$CH_3$ | " | " | H | 595 | " |
| 17 | " | —CH=$CH_2$ | " | " | H | 601 | " |
| 18 | " | —$CH_3$ | " | —$C_{10}H_{21}$ | H | 605 | " |

TABLE 1-continued

| Ex. No. | $R_7$ | $R_{1a}$ | $R_{2a}$ | $R_3$ | $R_4$ | λmax. in nm | Shades of dyeing on polyester |
|---|---|---|---|---|---|---|---|
| 19 | " | " | " | $-C_{12}H_{25}$ | $-CH_2CH=CH_2$ | 612 | greenish blue |
| 20 | " | " | " | $-C_{10}H_{21}$ | $-C_2H_4CN$ | 590 | reddish-blue |
| 21 | " | " | " | " | $-CH_2-CH=CH_2$ | 612 | blue |
| 22 | " | $C_{11}H_{23}$ | " | $-CH_2CH_3$ | $C_2H_4OCOC_2H_5$ | 609 | " |
| 23 | " | $CH_3$ | " | $-C_{10}H_{21}$ | $-C_2H_4COOC_2H_5$ | 608 | " |
| 24 | " | " | " | " | $-C_2H_4OCOCH_3$ | 608 | " |
| 25 | " | " | " | " | $-C_2H_4-OCOCH_3$ (C=O) | 607 | " |
| 26 | Br | $-CH_3$ | $-CH_3$ | $-C_{10}H_{21}$ | $-CH_2CHCH_2OCH_2CH=CH_2$ with $OCOCH_3$ | 608 | greenish-blue |
| 27 | " | " | " | " | $-C_2H_4-OCH_3$ | 614 | " |
| 28 | $-CN$ | " | " | $-C_{12}H_{25}$ | H | 624 | blue-green |
| 29 | " | " | " | $-C_{10}H_{21}$ | H | 624 | " |
| 30 | " | " | " | $-CH(CH_3)C_{10}H_{21}$ | H | 625 | " |

EXAMPLES 31–35

The following compounds can be prepared by a method analogous to that of Example 1 from appropriate reactants

TABLE 2

| Ex. No. | Structure | λmax. in nm | Shades of dyeing on polyester |
|---|---|---|---|
| 31 | 2,6-dichloro-3-nitro-4-($O_2N$)phenyl–N=N–[3-methoxy-5-NHCOCH$_3$-phenyl]–NH–CH$_2$CH$_2$COOC$_{12}$H$_{25}$ | 600 | navy blue |
| 32 | 4-nitro-2-($O_2N$)-5,6-dichlorophenyl–N=N–[3-methoxy-5-NHCOCH$_3$-phenyl]–NH–CH$_2$CH$_2$COOC$_{12}$H$_{25}$ | 590 | " |
| 33 | 2-bromo-4-nitro-6-($O_2N$)phenyl–N=N–[3-methoxy-5-methylphenyl]–N(C$_{12}$H$_{25}$)(CH$_2$CH$_2$OCH$_3$) | 590 | " |
| 34 | 2,6-dicyano-4-($O_2N$)phenyl–N=N–[3-methoxy-5-methylphenyl]–N(C$_{12}$H$_{25}$)(CH$_2$CH$_2$O–CO–CH$_3$) | | blue |

TABLE 2-continued

| Ex. No. | | λmax. in nm | Shades of dyeing on polyester |
|---|---|---|---|
| 35 | 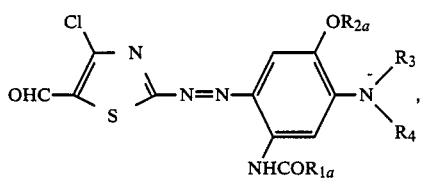 | | navy blue |

EXAMPLES 36–41

Compounds of the formula

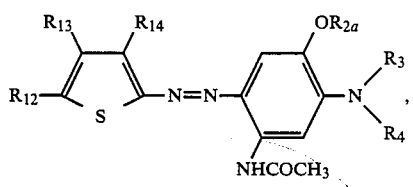

in which $R_{1a}$ to $R_4$ are defined in Table 3 below, can be prepared by a method analogous to that of Example 1 from appropriate reactants.

in which $R_{2a}$, $R_3$, $R_4$, $R_{11}$ and $R_{14}$ are as defined in Table 4 below, can be prepared from appropriate reactants by a method analogous to that of Example 1. $R_{12}$ is —CN in Examples 42 to 51 and —CHO in Examples 52 and 53.

TABLE 4

| Ex. No. | $R_{13}$ | $R_{14}$ | $R_{2a}$ | $R_3$ | $R_4$ | Shade of dyeing on polyester |
|---|---|---|---|---|---|---|
| 42 | —CH$_3$ | —CN | —CH$_3$ | H | —C$_2$H$_4$COOC$_{12}$H$_{25}$ | navy blue |
| 43 | " | " | " | —C$_2$H$_5$ | " | greenish-blue |
| 44 | " | " | —C$_2$H$_5$ | " | " | " |
| 45 | " | " | " | H | " | navy blue |
| 46 | —C$_6$H$_5$ | " | —CH$_3$ | H | " | " |
| 47 | " | " | | —C$_2$H$_5$ | H | " |
| 48 | —CH$_3$ | —COOC$_2$H$_5$ | —CH$_3$ | H | " | " |
| 49 | " | " | " | —C$_2$H$_5$ | " | " |
| 50 | " | " | —C$_2$H$_5$ | " | " | " |
| 51 | " | " | " | H | " | " |
| 52 | Cl | —CN | —CH$_3$ | —C$_{10}$H$_{21}$ | —CH$_2$—CH=CH$_2$ | greenish-blue |
| 53 | " | " | —C$_2$H$_5$ | " | " | " |

TABLE 3

| Ex. No. | $R_{1a}$ | $R_{2a}$ | $R_3$ | $R_4$ | =max. in nm | Shade of dyeings on polyester |
|---|---|---|---|---|---|---|
| 36 | —CH$_3$ | —CH$_3$ | H | —C$_2$H$_4$COOC$_{12}$H$_{25}$ | 608 | navy blue |
| 37 | " | " | —C$_2$H$_5$ | " | 628 | greenish-blue |
| 38 | " | —C$_2$H$_5$ | " | " | 629 | " |
| 39 | " | " | H | " | 610 | navy blue |
| 40 | " | —CH$_3$ | —C$_{10}$H$_{21}$ | —CH$_2$—CH=CH$_2$ | 631 | greenish-blue |
| 41 | " | —C$_2$H$_5$ | " | " | 632 | " |

EXAMPLES 42 to 53

Compounds of the formula

APPLICATION EXAMPLE

The dyestuff of formula 1a (prepared according to Example 1) is sandmilled in the presence of a commercially available ligninsulphonate (dispersing agent) followed by atomisation to form an ultradisperse dyeing preparation having an average particle size of 1μ and a coupage ratio of 3.5:10.

24 Parts of the above produced preparation are dispersed in 1000 parts of water and this is then added to 13,000 parts of a mother liquor containing 30 part of ammonium sulphate and 0.3 parts of formic acid as buffer (optionally with a carrier or levelling medium) at 60° C. in a dyeing autoclave. A pre-washed cross-bobbin (1000 parts of polyester yarn on a plastic frame) is added to the dyeing autoclave, which is then closed and heated over 35 minutes to 130° C. After 90 minutes, the autoclave is cooled to 80° C., the spent liquor is removed and the dyed substrate is washed thoroughly with cold water and then is reductively cleared.

After elimination of water, the substrate is dried. The resulting dyeing is of a navy blue nuance and is free of filtrations (i.e., impurities).

Instead of the compound of formula 1a an appropriate amount of any one of Examples 2 to 53 may be used in the method of the Application Example.

What is claimed is:

1. A process of dyeing a textile substrate comprising applying a compound of the formula

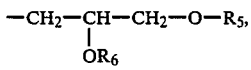

to a textile substrate from an aqueous medium, wherein
D is

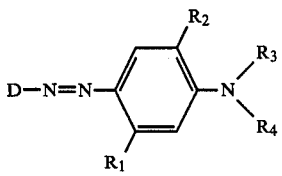

wherein
$R_7$ is hydrogen, cyano or halo,
$R_8$ is hydrogen or chloro,
$R_9$ is hydrogen or chloro, with the proviso that at least one of $R_8$ and $R_9$ is hydrogen,
$R_{10}$ is cyano or nitro,
$R_{12}$ is formyl, cyano, nitro, $(C_{1-4}alkoxy)carbonyl$ or $(C_{1-4}alkyl)carbonyl$,
$R_{13}$ is hydrogen, chloro, $C_{1-3}alkyl$ or phenyl, and
$R_{14}$ is cyano, nitro or $(C_{1-4}alkoxy)carbonyl$,
$R_1$ is hydrogen; $C_{1-2}alkyl$; $C_{1-2}alkoxy$; formylamino; $(C_{1-4}alkyl)carbonylamino$; $(C_{1-4}alkyl)carbonylamino$ the alkyl group of which is substituted by 1 to 3 substituents independently selected from halo, $C_{1-3}alkoxy$, cyano, phenyl, phenoxy and benzyloxy; $(C_{2-4}alkenyl)carbonylamino$; halo$(C_{2-4}alkenyl)carbonylamino$; benzoylamino; benzoylamino the phenyl group of which is substituted by 1 to 3 substituents independently selected from halo, $C_{1-4}alkyl$ and $C_{1-4}alkoxy$; $(C_{1-4}alkoxy)carbonylamino$; $(C_{1-4}alkoxy)carbonylamino$ the alkyl moiety of which is substituted by 1 to 3 substituents independently selected from halo, $C_{1-3}alkoxy$, cyano, phenyl, phenoxy and benzyloxy; $(C_{8-14}alkyl)carbonylamino$ or $(C_{8-14}alkoxy)carbonylamino$,
$R_2$ is $C_{1-4}alkoxy$ or $2$-$(C_{1-4}alkoxy)ethoxy$,
$R_3$ is hydrogen, $C_{1-4}alkyl$, $C_{8-14}alkyl$, $2$-$(C_{8-14}alkoxy)carbonylethyl$, $2$-$(C_{8-14}alkyl)carbonyloxyethyl$ or $2$-$(C_{8-14}alkoxy)carbonyloxyethyl$, and
$R_4$ is hydrogen, $C_{1-4}alkyl$, 2-cyanoethyl, $2$-$(C_{1-3}alkoxy)ethyl$, $2$-$(C_{1-4}alkyl)carbonyloxyethyl$, $2$-$(C_{1-4}alkoxy)carbonylethyl$, $2$-$(C_{1-4}alkoxy)carbonyloxyethyl$, $C_{3-4}alkenyl$,

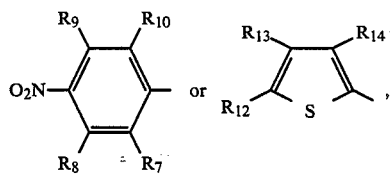

$C_{8-14}alkyl$, $2$-$(C_{8-14}alkyl)carbonyloxyethyl$, $2$-$(C_{8-14}alkoxy)carbonylethyl$ or $2$-$(C_{8-14}alkoxy)carbonyloxyethyl$,
wherein
$R_5$ is $C_{1-4}alkyl$, allyl, $(C_{1-3}alkyl)carbonyl$, phenyl or phenyl substituted by 1 to 3 substituents independently selected from halo, $C_{1-2}alkyl$ and $C_{1-2}alkoxy$, and
$R_6$ is hydrogen, $C_{1-4}alkyl$ or $(C_{1-3}alkyl)carbonyl$, with the proviso that one and only one of $R_1$, $R_3$ and $R_4$ is or contains a $C_{8-14}alkyl$ group or moiety.

2. A process according to claim 1 wherein D is

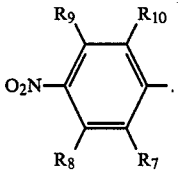

3. A process according to claim 2 wherein D is

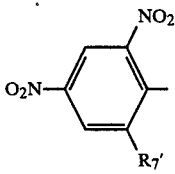

wherein
$R_{7'}$ is chloro or bromo.

4. A process according to claim 3 wherein the compound is applied to the textile substrate at a temperature above 120° C.

5. A process according to claim 3 wherein
$R_1$ is hydrogen; $C_{1-2}alkyl$; $C_{1-2}alkoxy$; formylamino; $(C_{1-4}alkyl)carbonylamino$; $(C_{1-4}alkyl)carbonylamino$ the alkyl group of which is monosubstituted by halo, $C_{1-3}alkoxy$, cyano, phenyl, phenoxy or benzyloxy; $(C_{2-4}alkenyl)carbonylamino$; halo$(C_{2-4}alkenyl)carbonylamino$; benzoylamino; benzoylamino the phenyl group of which is monosubstituted by halo, $C_{1-4}alkyl$ or $C_{1-4}alkoxy$; $(C_{1-4}alkoxy)carbonylamino$; $(C_{1-4}alkoxy)carbonylamino$ the alkyl moiety of which is monosubstituted by halo, $C_{1-3}alkoxy$, cyano, phenyl, phenoxy or benzyloxy; $(C_{8-14}alkyl)carbonylamino$ or $(C_{8-14}alkoxy)carbonylamino$, and
$R_5$ is $C_{1-4}alkyl$, allyl, $(C_{1-3}alkyl)carbonyl$, phenyl or phenyl monosubstituted by halo, $C_{1-2}alkyl$ or $C_{1-2}alkoxy$.

6. A process according to claim 4 wherein
$R_1$ is $(C_{1-2}alkyl)carbonylamino$, and
$R_2$ is $C_{1-2}alkoxy$ or $2$-$(C_{1-2}alkoxy)ethoxy$.

7. A process according to claim 6 with the proviso that when one of $R_3$ and $R_4$ is hydrogen or $C_{1-4}$alkyl, the other is 2-($C_{8-14}$alkoxy)carbonylethyl.

8. A process according to claim 7 wherein
$R_3$ is hydrogen or $C_{1-4}$alkyl, and
$R_4$ is 2-($C_{10-12}$alkoxy)carbonylethyl, or
$R_3$ is $C_{10-12}$alkyl, and
$R_4$ is hydrogen or allyl.

9. A process according to claim 8 wherein the compound is applied to the textile substrate at a temperature above 120° C.

10. A process according to claim 9 wherein the textile substrate comprises a linear aromatic polyester, cellulose 2½ acetate, cellulose triacetate or a synthetic polyamide.

11. A process according to claim 10 wherein the textile substrate comprises a linear aromatic polyester.

12. A process according to claim 7 wherein the compound is

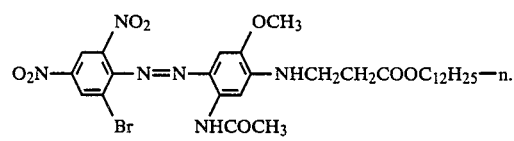

13. A textile substrate having applied thereto a monoazo compound of the formula

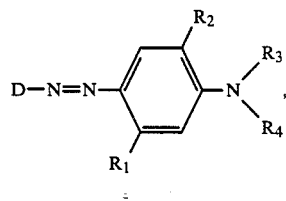

wherein
D is a diazo component radical of the 4-nitrophenyl series or the thienyl-2 series,
$R_1$ is hydrogen; $C_{1-2}$alkyl; $C_{1-2}$alkoxy; formylamino; ($C_{1-4}$alkyl)carbonylamino; ($C_{1-4}$alkyl)carbonylamino the alkyl group of which is substituted by 1 to 3 substituents independently selected from halo, $C_{1-3}$alkoxy, cyano, phenyl, phenoxy and benzyloxy; ($C_{2-4}$alkenyl)carbonylamino; halo($C_{2-4}$alkenyl)carbonylamino; benzoylamino; benzoylamino the phenyl group of which is substituted by 1 to 3 substituents independently selected from halo, $C_{1-4}$alkyl and $C_{1-4}$alkoxy; ($C_{1-4}$alkoxy)carbonylamino; ($C_{1-4}$alkoxy)carbonylamino the alkyl moiety of which is substituted by 1 to 3 substituents independently selected from halo, $C_{1-3}$alkoxy, cyano, phenyl, phenoxy and benzyloxy; ($C_{8-14}$alkyl)carbonylamino or ($C_{8-14}$alkoxy)carbonylamino,
$R_2$ is $C_{1-4}$alkoxy or 2-($C_{1-4}$alkoxy)ethoxy,
$R_3$ is hydrogen, $C_{1-4}$alkyl, 2-($C_{8-14}$alkoxy)carbonylethyl, 2-($C_{8-14}$alkyl)carbonyloxyethyl or 2-($C_{8-14}$alkoxy)carbonyloxyethyl, and
$R_4$ is hydrogen, $C_{1-4}$alkyl, 2-cyanoethyl, 2-($C_{1-3}$alkoxy)ethyl, 2-($C_{1-4}$alkyl)carbonyloxyethyl, 2-($C_{1-4}$alkoxy)carbonylethyl, 2-($C_{1-4}$alkoxy)carbonyloxyethyl, $C_{3-4}$alkenyl,

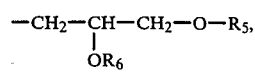

2-($C_{8-14}$alkyl)carbonyloxyethyl, 2-($C_{8-14}$alkoxy)carbonylethyl or 2-($C_{8-14}$alkoxy)carbonyloxyethyl,
wherein
$R_5$ is $C_{1-4}$alkyl, allyl, ($C_{1-3}$alkyl)carbonyl, phenyl or phenyl substituted by 1 to 3 substituents independently selected from halo, $C_{1-2}$alkyl and $C_{1-2}$alkoxy, and
$R_6$ is hydrogen, $C_{1-4}$alkyl or ($C_{1-3}$alkyl)carbonyl, with the proviso that one and only one of $R_1$, $R_3$ and $R_4$ contains a $C_{8-14}$alkyl moiety.

14. A textile substrate according to claim 13 wherein D is

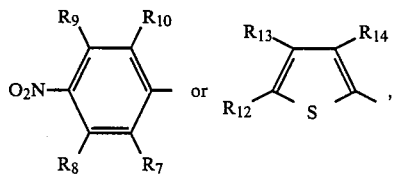

wherein
$R_7$ is hydrogen, cyano or halo,
$R_8$ is hydrogen or chloro,
$R_9$ is hydrogen or chloro, with the proviso that at least one of $R_8$ and $R_9$ is hydrogen,
$R_{10}$ is cyano or nitro,
$R_{12}$ is formyl, cyano, nitro, ($C_{1-4}$alkoxy)carbonyl or ($C_{1-4}$alkyl)carbonyl,
$R_{13}$ is hydrogen, chloro, $C_{1-3}$alkyl or phenyl, and
$R_{14}$ is cyano, nitro or ($C_{1-4}$alkoxy)carbonyl.

15. A textile substrate according to claim 14 wherein D is

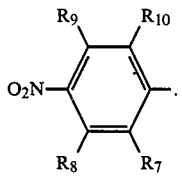

16. A textile substrate according to claim 15 wherein D is

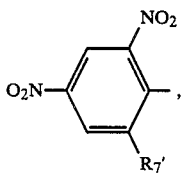

wherein
$R_7'$ is chloro or bromo.

17. A textile substrate according to claim 16 wherein
$R_1$ is hydrogen; $C_{1-2}$alkyl; $C_{1-2}$alkoxy; formylamino; ($C_{1-4}$alkyl)carbonylamino; ($C_{1-4}$alkyl)carbonylamino the alkyl group of which is monosubstituted by halo, $C_{1-3}$alkoxy, cyano, phenyl, phenoxy or benzyloxy; ($C_{2-4}$alkenyl)carbonylamino; halo($C_{2-4}$alkenyl)carbonylamino; benzoylamino; benzoylamino the phenyl group of which is monosubstituted by halo, $C_{1-4}$alkyl or $C_{1-4}$alkoxy; ($C_{1-4}$alkoxy)carbonylamino; ($C_{1-4}$alkoxy)carbonylamino the alkyl moiety of which is monosubstituted by halo, $C_{1-3}$alkoxy, cyano, phenyl, phenoxy or benzyloxy; ($C_{8-14}$alkyl)carbonylamino or ($C_{8-14}$alkoxy)carbonylamino, and $R_5$ is $C_{1-4}$alkyl, allyl, ($C_{1-3}$alkyl)carbonyl, phenyl or phenyl monosubstituted by halo, $C_{1-2}$alkyl or $C_{1-2}$alkoxy.

18. A textile substrate according to claim 17 wherein
$R_1$ is ($C_{1-2}$alkyl)carbonylamino,
$R_2$ is $C_{1-2}$alkoxy or 2-($C_{1-2}$alkoxy)ethoxy,
$R_3$ is hydrogen or $C_{1-4}$alkyl, and
$R_4$ is 2-($C_{10-12}$alkoxy)carbonylethyl.

19. A textile substrate according to claim 13 comprising a linear aromatic polyester, cellulose 2½ acetate, cellulose triacetate or a synthetic polyamide.

20. A textile substrate according to claim 19 comprising a linear aromatic polyester.

* * * * *